Dec. 30, 1958

J. J. ECKERT 2,866,558

OIL SEPARATORS

Filed July 28, 1955

INVENTOR.
JOHN J. ECKERT
BY Alexander Riaboff
ATTORNEY

Dec. 30, 1958  J. J. ECKERT  2,866,558
OIL SEPARATORS
Filed July 28, 1955  2 Sheets-Sheet 2
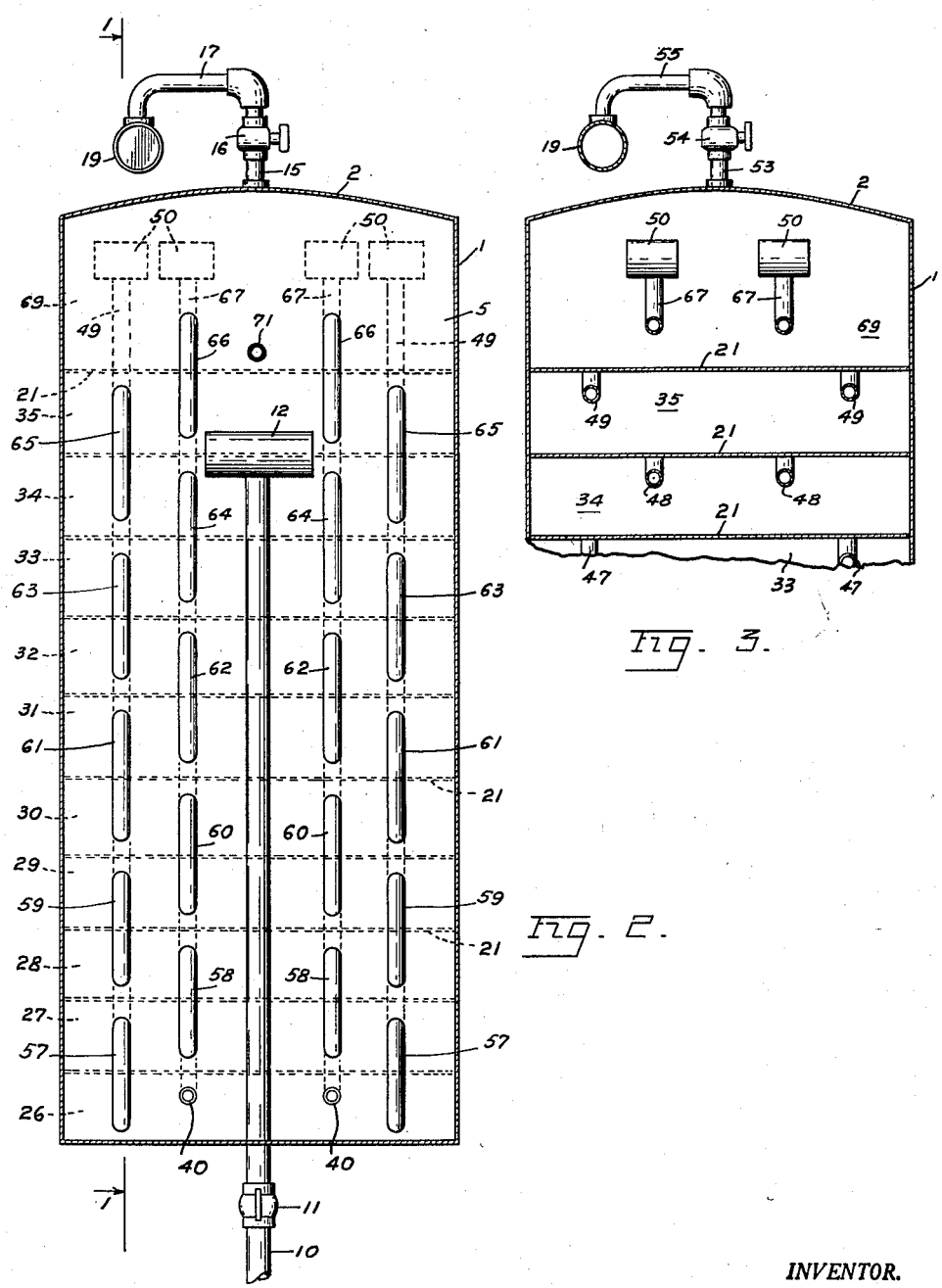
INVENTOR.
JOHN J. ECKERT
BY Alexander Riaboff
ATTORNEY

United States Patent Office 2,866,558
Patented Dec. 30, 1958

2,866,558

OIL SEPARATORS

John J. Eckert, Daly City, Calif.

Application July 28, 1955, Serial No. 524,981

7 Claims. (Cl. 210—540)

This invention relates to an oil separator.

The object of this invention is to provide a simple and efficient device for separating oil from bilge water of a vessel. Another object of my invention is to provide a multiple stage oil separator wherein oil is separated from bilge water by subjecting the same to the oil separating process over and over again.

Another object of this invention is to achieve oil separation from bilge water by a mechanical process and without using filters or strainers of any kind.

Other objects and advantages will appear as the specification proceeds and the novel features of the device will be particularly pointed out in the claims hereto annexed.

In this specification and the annexed drawing, the invention is illustrated in the form considered to be the best but it is understood, that the invention is not limited to such form; and it is also to be understood that in and by the claims following the description, it is desired to cover the invention in whatsoever form it may be embodied.

My invention is illustrated in the accompanying drawings in which:

Fig. 2 is a sectional view taken along the line 2—2 of Fig. 1; and

Fig. 3 is a partial sectional view taken along the line 3—3 of Fig. 1.

Figure 1:
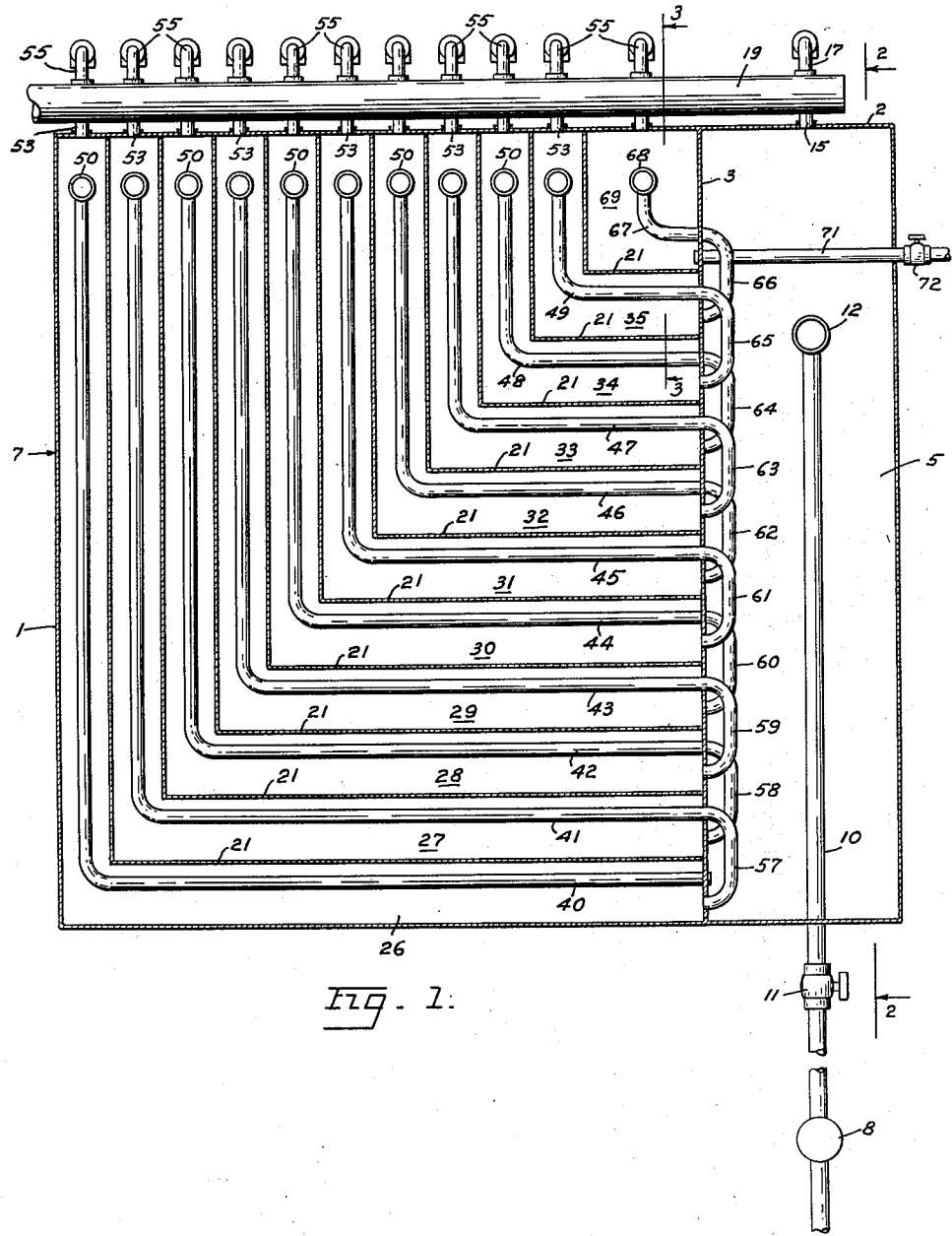
Fig. 1 is a sectional view taken along the line 1—1 of Fig. 2.

An apparatus comprising the subject matter of this invention comprises a closed container 1 having a convex top 2 and being divided by a partition, or a wall 3, into a bilge water compartment 5 and an oil separating compartment 7. Bilge water is pumped by a pump 8 through an inlet pipe 10 from the bilge of a vessel into the bilge water compartment 5. A cock 11 is provided in the pipe 10 to regulate the flow of said bilge water therethrough.

The inlet pipe 10 extends into the bilge water compartment a certain distance and terminates with a discharge pipe 12 of much larger diameter than that of said pipe 10. Bilge water passes through the pipe 10 under a certain pressure and upon reaching said discharge pipe 12 is relieved of said pressure. This change in the pressure facilitates the separation of oil from bilge water, in which said oil is carried in form of emulsion. Water being the heavier of the two, settles down and the oil floats upwardly and collects under said top 2.

Means are provided for discharging oil collected in the bilge water compartment 5 which means consist of an oil discharge pipe 15 provided with a cock 16 for regulating the rate of discharge of said oil. A horizontal pipe 17 leads oil from the cock 16 downwardly into an oil collecting pipe 19 from which oil is discharged into a tank not shown in the drawings.

The remaining bilge water still has considerable content of oil, which is recovered in the oil separating compartment 7.

The latter compartment is closed on all sides and is divided by a plurality of angular partitions 21 of progressively diminishing size into a plurality of progressively diminishing chambers numbered consecutively 26 to 35. Each of said chambers has a comparatively narrow horizontal portion at the end of which is a narrow vertical portion extending to the top 2. Each succeeding chamber has its horizontal and vertical parts shorter than those of the preceding chamber. Each chamber contains an L-shaped conduit numbered 40 to 49 successively, each extending horizontally from the partition, or the wall 3, and then vertically and terminating with a discharge pipe 50 in close proximity of said top 2. The discharge pipe 50 is of much larger diameter than that of each of the conduits 40—49, and is provided for the purpose of facilitating the separation of oil from bilge water.

The lowermost conduit 40 communicates with the bilge water compartment 5. Bilge water flows from the compartment 5 into said conduit 40. When the level of bilge water in the compartment 5 reaches substantially the top 2, bilge water in said conduit 40 reaches the top thereof and is discharged through the discharge pipe 50 into the chamber 26. At this moment the separation of oil from bilge water takes place, the water settles down and the lighter oil floats, and when the chamber 26 is filled with bilge water, oil collects under the top 2, and is discharged from said chamber into said oil collecting pipe 19 through an oil discharge pipe 53, a cock 54 and a pipe 55, which correspond to the above described pipe 15, the cock 16 and the pipe 17.

The remaining bilge water discharged into the chamber 26, passes gradually into the conduit 41 in the chamber 27 through a connecting pipe 57, connecting said chamber 26 with said conduit 41, and is discharged through the discharge pipe 50 into the chamber 27. Oil is separated in this chamber from the bilge water, and the separated oil collects under the top 2. The bilge water containing still less oil passes from the chamber 27 into the conduit 42 in the chamber 28 through a connecting pipe 58.

Each succeeding chamber is connected with a conduit in the next following chamber by connecting pipes which are numbered 59 to 65. Bilge water gradually passes through each chamber and each conduit, and in each chamber separation of oil takes place. Bilge water finally reaches the chamber 35. The latter is connected by a connecting pipe 66 with an L-shaped conduit 67 having a discharge pipe 68 housed in the last rectangular chamber 69, wherein the last separation of oil from bilge water takes place.

Oil from each of said chambers is discharged into the oil collector pipe 19 through the oil discharge pipe 53, the cock 54 and the horizontal pipe 55, as above described.

The remaining water is discharged from the last chamber 69 through a water pipe 71 having a cock 72 to regulate the flow of water therethrough.

Figures 2 and 3 show that the apparatus contains two banks of the conduits 40 to 49 and 67. If desired, other banks of conduits may be added to increase the capacity of the apparatus. By regulating the flow of bilge water by cock 11 into the bilge water chamber 5, the discharge of oil by cocks 16 and 54, and the discharge of water by cock 72, a balance may be achieved by which practically pure oil is discharged into the oil collector pipe 19, and water practically without oil is discharged out of the pipe 71, and any desirable pressure may be maintained within the apparatus.

At the beginning of the oil separating operation the cocks 16 are preferably kept closed, and are opened gradually beginning with the cock 16 of the chamber 26. The cocks 16 are opened only so much as to pass oil through. But if no oil is passing through a certain cock 16, that cock and all the following cocks are kept closed, as the absence of oil passing through a certain cock indicates that the oil separating operation has been completed in previous chambers. Hence, the number of the cocks 16 to be opened varies and depends upon the oil content in bilge water, temperature and other conditions.

I claim:

1. An apparatus for separating oil from bilge water flowing in a continuous stream, comprising a closed container having a top and divided by a wall into a bilge water compartment and and oil separating compartment; an inlet pipe for delivering bilge water into said first compartment, said pipe extending into said first compartment and terminating in close vicinity to the top with a discharge pipe arranged at a right angle to said inlet pipe for facilitating the separation of oil from said bilge water passing through said inlet pipe and its discharge pipe into said bilge water compartment; a plurality of partitions dividing said oil separating compartment into a plurality of chambers; a conduit in each of said chambers terminating in close vicinity to the top; a discharge pipe at the end of each conduit for facilitating the separation of oil from bilge water passing therethrough, the conduit of the first chamber communicating with the bilge water compartment for passing bilge water from said compartment through said conduit and its discharge pipe into said first chamber; each chamber except the last one being in communication in the series with the conduit of the next chamber for passing said bilge water through each chamber; a water pipe for passing water from the last chamber; means for regulating the flow of water in said water pipe; an oil discharge pipe connected to each chamber for discharging oil separated from bilge water; and means for regulating the flow of oil in each of said oil discharge pipe.

2. An apparatus for separating oil from bilge water comprising a closed container having a top and divided by a wall into a bilge water compartment and an oil separating compartment; an inlet pipe in said bilge water compartment for delivering bilge water thereinto, a means for facilitating the separation of oil from said bilge water on said inlet pipe; an oil discharge means communicating with said bilge water compartment for discharging oil from said compartment; said oil separating compartment being divided into a plurality of closed chambers; a conduit in each chamber extending toward the top, a means for facilitating the separation of oil from said bilge water on each of said conduits; the conduit in the first chamber being in communication with the bilge water compartment to permit the bilge water to flow from the latter compartment through said conduit into said first chamber; each chamber except the last one being in communication with the conduit of the next adjoining chamber to permit the bilge water to flow successively through each conduit and chamber; an oil discharge means communicating with each chamber for discharging oil separated from said bilge water; a water pipe leading from the last chamber for discharging water; means for regulating the flow of bilge water into the bilge water compartment; means for regulating the flow of oil from said bilge water compartment; means for regulating the flow of oil from each chamber; and means for regulating the flow of water from the last chamber.

3. An apparatus for separating oil from bilge water flowing in a continuous stream, comprising a closed container having a top and divided into a bilge water compartment and an oil separating compartment; an inlet pipe for bringing said bilge water into said bilge water compartment; a means for regulating the flow of said bilge water into said bilge water compartment; said oil separating compartment being divided into a plurality of separate closed chambers; a conduit in each chamber, means connected to each of said conduits for facilitating the separation of oil from bilge water; the conduit of the first chamber being in communication with the bilge water compartment for conducting said bilge water through said conduit into said chamber; each chamber except the last one being in communication with the conduit of the adjoining chamber to conduct said bilge water successively through each conduit and chamber; an oil discharge means communicating with each chamber for discharging oil separated from the bilge water passing therethrough; means for regulating the flow of oil through the oil discharging means; a water pipe connected to the last chamber for discharging water; and means for regulating the flow of water through said water pipe.

4. An apparatus for separating oil from bilge water flowing in a continuous stream, comprising a series of closed chambers; a conduit in each of said chambers; means on each of said conduits for facilitating the separation of oil from said bilge water; means carried by each chamber for discharging oil separated from said bilge water; means for regulating the flow of oil through the last mentioned means; means connected with the conduit of the first chamber for bringing bilge water into said conduit and through the latter into said chamber; means for regulating the flow of said bilge water through the last mentioned means, each chamber except the last one being in communication with the conduit of the next chamber to provide a passage for bilge water successively through each conduit and each chamber; a water pipe connected to the last chamber for discharging water therefrom; and means for regulating the flow of water through said pipe.

5. An apparatus for separating oil from bilge water flowing in a continuous stream, comprising a plurality of closed chambers each having a top; a conduit in each chamber terminating near the top; means for facilitating the separation of oil from the bilge water passing through said conduits into said chambers; means on the top of each chamber for collecting oil separated from the bilge water; means for regulating the flow of oil through the last mentioned means; means connected to the conduit in the first chamber for conducting bilge water into said conduit and therethrough into said chamber; means for regulating the flow of bilge water in the last mentioned means; each chamber being in communication with the conduit of a next chamber to permit bilge water to travel successively through every chamber and conduit; a water pipe connected to the last chamber for discharging water therefrom; and means for regulating the flow of water through said water pipe.

6. An apparatus for separating oil from bilge water flowing in a continuous stream, comprising a plurality of closed chambers, each having a top and a bottom, a conduit in each chamber extending from the vicinity of the bottom and terminating near the top; means carried by said conduits for facilitating the separation of oil from the bilge water passing through said chambers and conduits; a pipe on the top of each chamber for discharging oil separated from the bilge water; means for regulating the flow of oil through said pipe; an oil collecting pipe connecting said oil discharging pipes; means for bringing bilge water into the conduit of the first chamber; means for regulating the flow of said bilge water in the last mentioned means; each chamber being in communication with the conduit of the next chamber for providing a continuous passage of bilge water successively through every chamber and conduit; a water pipe connected to the last chamber for discharging water therefrom and means for regulating the flow of the discharged water through said water pipe.

7. An apparatus for separating oil from bilge water comprising a closed container, divided by partitions into a plurality of progressively diminishing closed chambers, each having a top and a bottom, a conduit in each chamber extending from the vicinity of the bottom toward the top and terminating near the same; means carried by the end of each conduit for facilitating the separation of oil from the bilge water passing through said conduit into the respective chamber; a pipe operatively connected to the top of each chamber for discharging oil separated from the bilge water; means secured to said pipes for regulating the flow of oil therethrough; an oil collecting pipe connected to the first mentioned pipes for collecting oil passing thereinto from the chambers; means for bringing bilge water into the conduit of the first chamber; means for regulating the flow of bilge water in the last mentioned means; each chamber being in communication with the conduit of the next chamber for providing a continuous passage of bilge water successively through every conduit and chamber; a water pipe connected to the last chamber for discharging water therefrom; and means for regulating the flow of the discharged water through said water pipe.

References Cited in the file of this patent

UNITED STATES PATENTS

| | | |
|---|---|---|
| 889,664 | Crozier | June 2, 1908 |
| 995,521 | Buhr | June 20, 1911 |
| 1,645,093 | Comyn | Oct. 11, 1927 |
| 1,708,021 | Lenz et al. | Apr. 9, 1929 |
| 2,702,124 | Stengel | Feb. 15, 1955 |